United States Patent Office 3,748,351
Patented July 24, 1973

---

3,748,351
2,3-BIS(DIFLUORAMINO)-1,4-BUTANEDIOL DIFORMATE AND DINITRATE
Robert K. Armstrong, Glassboro, and Gerald L. Brennan and Robert H. Sullivan, Woodbury, N.J., assignors to E. I. du Pont de Nemours and Company, Wilmington, Del.
No Drawing. Filed Nov. 12, 1964, Ser. No. 412,277
Int. Cl. C07c 77/02, 69/08
U.S. Cl. 260—467  7 Claims The present invention relates to a process for the preparation of 2,3 - bis(difluoramino) - 1,4 - butanediol dinitrate, $$O_2NO-CH_2-CH(NF_2)-CH(NF_2)-CH_2-ONO_2$$

a high-energy chemical useful in propellant formulations. The present invention relates also to new compounds useful in the preparation of said dinitrate compound.

Copending application Ser. No. 165,723, filed Jan. 8, 1962, now U.S. Pat. No. 3,410,870, describes the preparation of 2,3 - bis(difluoramino) - 1,4 - butanediol dinitrate by a process wherein 4,7-dihydro-1,3-dioxepin, i.e.,

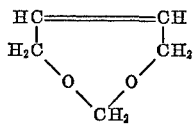

reacts with tetrafluorohydrazine, and the resulting 5,6-bis(difluoramino)-1,3-dioxepane, i.e.,

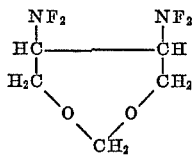

reacts with a nitrating acid. In the latter reaction the dioxepane ring is cleaved, and a by-product, methylene dinitrate, forms in addition to the desired difluoramino-substituted butanediol dinitrate. The presence of methylene dinitrate in the reaction mixture is undesirable, however, since this compound is extremely unstable and may detonate suddenly.

It now has been found that 2,3 - bis(difluoramino)-1,4-butanediol dinitrate can be prepared, without the formation of hazardous by-products, by a process which comprises reacting a lower aliphatic diester of 2,3 - bis(difluoramino)-1,4-butanediol with nitric acid. A preferred embodiment of this invention comprises (a) reacting 2-butene-1,4-diol with at least one lower aliphatic, i.e., 1–8 carbon aliphatic, acylating agent, preferably a 1 to 4 carbon alkanoic acid or an anhydride or acid halide thereof, especially one of the group consisting of formic acid, acetic acid, acetic anhydride, and acetyl chloride; (b) reacting the resulting 2-butene-1,4-diol diester with tetrafluorohydrazine; and (c) reacting the resulting 2,3-bis(difluoramino) - 1,4 - butanediol diester with nitric acid either alone or with other acids, for example, as a mixed nitrating acid. Two intermediates formed in the present process, i.e., 2-butene - 1,4 - diol diformate and 2,3 - bis(difluoramino) - 1,4 - butanediol diformate, are new and useful compounds. In addition to being useful as precursors to the propellant ingredient prepared by the present process, 2,3-bis(difluoramino)-1,4-butanediol diformate is per se a propellant and explosive compound, and 2-butene-1,4-diol diformate can be used as a polymer intermediate.

In the first step of the present process, 2-butene-1,4-diol is esterified with a lower aliphatic acylating agent to form the corresponding diester; for example, with formic acid to form 2-butene-1,4-diol diformate, or with acetic acid, acetic anhydride, or acetyl chloride to form 2-butene - 1,4 - diol diacetate. In addition to the preferred formic acid, acetic acid, and derivatives thereof, other lower aliphatic acylating agents which can be used include propionic acid, butyric acid, and their anhydrides and acid halides. Mixtures of the aforementioned acylating agents also can be employed. While a solvent is not required in this reaction, generally a solvent is preferred in order to achieve a better mixing of reactants. The solvent preferably is a substance which is inert in the reaction system, is capable of dissolving the diol, and is not too high-boiling, so that it can be readily removed from the reaction mixture. Typical of the solvents which can be used are the aromatic hydrocarbons such as benzene and toluene, and the chlorinated hydrocarbons such as chloroform and methylene chloride. When acetyl chloride is used as a reactant, pyridine may be added to the reaction system so as to facilitate removal of the hydrochloric acid formed. This procedure results in the formation of pyridine hydrochloride, which can be separated from the reaction mixture by extraction with water. With the reaction employing pyridine and acetyl chloride, ether solvents are preferred, e.g., diethyl ether, glycol ethers, tetrahydrofuran, etc.

The esterification reaction which comprises the first step of the present process can be effected at room temperature, but in some cases elevated temperatures are preferred in order to increase the rate of reaction. Generally, temperatures above about 125° C. are not desired, however, since the diol or the diester product may undergo undesirable side-reactions at such temperatures. When elevated temperatures are used, a convenient procedure is to carry out the reaction at the reflux temperature of the solvent. Any water formed in the reaction can be removed during the reaction, if desired, by boiling it off as an azeotrope, for example, with acetic or formic acid or as an azeotrope with the solvent. The esterification reaction can be effected at atmospheric as well as super-atmospheric pressure. However, there generally is no advantage in operating at super-atmospheric pressure with the possible exception that such pressure may be desirable to prevent a low-boiling solvent from vaporizing below the reaction temperature.

The compound containing the acyl radical usually is used in the amount of at least two moles per mole of diol. A molar ratio of acyl compound to diol greater than 2 to 1 is required, however, when an acid-water azeotrope is removed during the reaction. The preferred formic acid need not be of 100% concentration; aqueous solutions of lower concentration, e.g., 88%, can be employed with equivalent results provided the necessary formic acid to diol molar ratio is achieved. The preferred acetic acid preferably is used as glacial acetic acid.

While a catalyst is not required to esterify the diol, when free acids, e.g., formic acid or acetic acid, are employed, the use of catalysts results in higher yields and is therefore preferred from an economic standpoint. Any esterification catalyst can be employed including, for example, sulfonic acids such as benzenesulfonic and p-toluenesulfonic acids, and cation-exchange resins. Particularly useful are resins which are highly crosslinked copolymers of styrene and divinylbenzene having sulfonic acid groups attached to the aromatic nuclei of the resin, such as the commercially available ion-exchange resin designated "Dowex" 50W–X8, 20–50 mesh, in the hydrogen form, as supplied by the Dow Chemical Company; the resin designated "Amberlite" IR–120 and supplied by the Rohm & Haas Company; and the macroreticular resin designated "Amberlyst" 15 and supplied by the Rohm & Haas Company.

The time required for the diol to react with the acyl compound varies depending on such factors as the acyl compound employed, the reaction temperature, catalyst, etc. Generally, at least about two hours are required for complete reaction to take place. Any solvent which may have been used is removed, e.g., by vacuum distillation, and the product is dried prior to use in the second step of the present process.

The reaction of 2-butene-1,4-diol diester, e.g., diformate or diacetate, with tetrafluorohydrazine can be effected either in the liquid or vapor phase. When the reaction is carried out in the liquid phase, an inert solvent preferably is used in conjunction with the olefinic diester in order to increase fluidity and to help dissipate any heat of reaction. The solvent can be any liquid which is not reactive with the reaction components under the conditions used and which is capable of dissolving the olefinic diester and tetrafluorohydrazine. Preferably the solvent is not too high-boiling so that it can be removed easily from the reaction product, e.g., by vacuum distillation. Compounds which are particularly useful as solvents in the reaction of the diester with tetrafluorohydrazine are the halogenated hydrocarbons, e.g., chloroform, methylene chloride, and chlorofluoro hydrocarbons such as 1,1,2-trichloro-1,2,2-trifluoroethane and trichlorofluoromethane. Ketones, e.g., acetone, also are useful.

The temperature at which the reaction between tetrafluorohydrazine and the olefinic diester is effected will vary according to other reaction variables but in general will be within the range of about 75° C. to about 250° C. Generally, when it is desired to operate at the lower end of the temperature range, e.g., at 75–150° C., the reaction will be carried out in the liquid phase since such a procedure more conveniently provides a longer contact time than a vapor-phase procedure. If it is desired to operate in the upper ranges, e.g., at 150–250° C., a vapor-phase procedure is more suitable, these temperatures being sufficient to provide the desired reaction at the shorter contact times. Possible decomposition of the difluoramino-substituted product at the higher temperatures is avoided in the vapor-phase procedure by rapid removal of the product from the reaction zone.

The reaction of the olefinic diester with tetrafluorohydrazine can be effected at atmospheric as well as superatmospheric pressure. For operation in the liquid phase, the use of superatmospheric pressure, for example at least about 70 p.s.i.g., is desirable in order to achieve a reasonably high reaction rate and to prevent any low-boiling solvent from vaporizing. Pressures as high as 500 p.s.i.g. and above can be used in liquid-phase reactions, although generally there is no advantage in operating at pressures much above 500 p.s.i.g. For operation in the vapor phase, the use of atmospheric pressure is entirely adequate; in this mode of operation, elevated pressures are unnecessary and generally are not preferred.

The amount of tetrafluorohydrazine used usually will be at least the stoichiometric amount required to add a pair of difluoramino groups to the double bond in the olefinic diester. However, it is preferred to introduce an excess of tetrafluorohydrazine to assure complete reaction.

The time required for the olefinic diester, e.g., diformate or diacetate, to react with the tetrafluorohydrazine varies depending on such factors as the reaction temperature, and the pressure employed in the liquid-phase procedure. Under moderate conditions in the liquid-phase procedure, the reaction generally is completed in about 1.5–2 hours. More severe conditions of temperature and pressure, however, lower the reaction time. In vapor-phase operation, reactant contact times can be as low as about 8–20 minutes.

The final step of the present process consists of a transesterification reaction between 2,3-bis(difluoramino)-1,4-butanediol diester and nitric acid, the latter preferably being present in a nitrating mixed acid, i.e., nitric acid admixed with an agent which assists in the formation of the nitronium ion, $NO_2^+$. The mixed acid can be nitric acid admixed with sulfuric acid, acetic acid, acetic anhydride, trifluoroacetic anhydride, etc. For economic reasons, however, the use of a nitric acid-sulfuric acid mixture is preferred. Mixtures having percent compositions corresponding to those ordinarily used in nitration reactions can be used, i.e., mixtures ranging from 20% $HNO_3$/60% $H_2SO_4$/20% $H_2O$ to 55% $NHO_3$/48% $H_2SO_4$ (said to have a negative percentage of water, −3%).

The amount of nitric acid used in the transesterification procedure is usually at least two moles per mole of diester, i.e., the stoichiometric amount required to transesterify both ester groups. However, an excess of nitric acid generally will be used in order to assure complete reaction. The mole ratio of nitric acid to diester can range, for example, from about 2/1 to about 50/1 or more.

While it is not necessary that the transesterification be carried out in the presence of a diluent, if desired an inert liquid diluent can be used in order to assist in dissipating the heat of reaction and in decreasing the oxidizing action of the nitric acid. Preferably, the diluent is a low-boiling compound, such as one of the chlorinated hydrocarbons, e.g., chloroform or methylene chloride.

The transesterification reaction preferably is carried out at a temperature within the range of about 0° C. to about 100° C. While lower temperatures can be used, they generally are not practical because of the low reaction rate and the cooling required. Temperatures above 100° C. can be used, but operation at such temperatures generally is undesirable inasmuch as the dinitrate may begin to decompose. The process can be effected at atmospheric as well as superatmospheric pressure. Generally, however, there is no advantage in operating at superatmospheric pressure with the possible exception that such pressure may be desirable when a low-boiling diluent is used.

The following examples serve to illustrate specific embodiments of the process of the present invention. However, the examples will be understood to be illustrative only and not to limit the invention in any manner.

EXAMPLE 1

(A) Preparation of 2-butene-1,4-diol diformate

To 44 grams of 2-butene-1,4-diol is added 66 grams of 99–100% formic acid and 11.7 grams of benzene. The mixture is refluxed for 2.5 hours. Then the reaction mixture is cooled and diluted with an equal volume of benzene, washed with two portions of water, and dried with magnesium sulfate. The benzene is distilled off in vacuo, and the remaining liquid is distilled at 2–3 mm. to give 25.2 grams of a colorless liquid boiling at 69–70° C., which is shown to be a single compound by vapor-phase chromatography. The liquid is identified as 2-butene-1,4-diol diformate, i.e.:

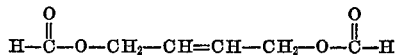

The infrared spectrum of the compound shows strong absorption at 5.8μ (>C=O), and an intense broad band at 8.5–8.6μ.

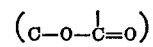

Proton resonance spectra show the presence of

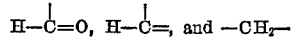

*Elemental analysis.*—Calcd. for $C_6H_8O_4$ (percent): C, 49.98; H, 5.60. Found (percent): C, 50.21; H, 5.58, 5.75.

When the above-described procedure is repeated with the use of 76 grams of 88% formic acid instead of 66 grams of 99–100% formic acid; 66 grams of benzene instead of 11.7 grams; and, additionally, 0.5 gram of "Amberlyst" 15, a sulfonic-acid containing macroreticular resin manufactured by the Rohm & Haas Company; and the mixture is refluxed for three hours while the water is continuously removed by a water trap, the same olefinic diformate is obtained in the amount of 54.7 grams.

The corresponding acetate can be prepared by substituting an equimolar quantity of acetic acid or acetic anhydride for the formic acid used above and repeating the procedure of this example.

(B) Preparation of 2,3-bis(difluoramino)-1,4-butanediol diformate

Tetrafluorohydrazine ($F_2N$—$NF_2$) under an initial pressure of 200 p.s.i.g. is introduced into a solution of 4 grams of 2-butene-1,4-diol diformate in 100 milliliters of chloroform; and the mixture is heated at 125° C. until the pressure remains constant (103 minutes). The chloroform is distilled off in vacuo; vacuum distillation of the remaining liquid gives 5.3 grams of a colorless liquid boiling at 82–83° C. at 0.65 mm. The liquid is identified as 2,3-bis(difluoramino)-1,4-butanediol diformate, i.e.:

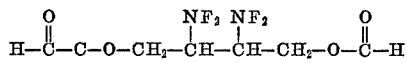

The infrared spectrum of the compound shows strong absorption at 5.78μ (>C=O), an intense broad band at 8.5–8.6μ

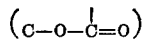

and —$NF_2$ absorption at 11–12μ. The fluorine and proton resonance spectra show the presence of

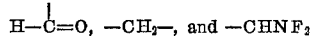

*Elemental analysis.*—Calcd. for $C_6H_8O_4N_2F_4$ (percent): C, 29.04; H, 3.48; N, 11.29; F, 30.63. Found (percent): C, 29.75; H, 3.69, 3.88; N, 10.68, 10.56; F, 30.33, 30.18.

2,3 - bis(difluoramino)-1,4-butanediol diformate is an explosive compound as indicated by the brisance test wherein it is placed in a 0.25-inch-diameter shell, the shell placed on end on a lead plate 1.5 inch x 1.5 inch x 5/32 inch thick, and the compound initiated by a blasting cap. In this test, the size of the hole produced in the plate is a measure of the degree of brisance, a No. 0 hole indicating the greatest explosive power measurable by the test, the degree of brisance decreasing with increasing number up to 6. 2,3-bis(difluoramino) - 1,4 - butanediol diformate makes a No. 1 hole in the lead plate, indicating that the compound is a powerful explosive. The explosive compound is safe to handle and store, as evidenced by its insensitivity to impact (fails to detonate in 50% of the trials made when a 5-kg. weight is dropped onto the compound through a distance of 96 cm.), insensitivity to static (does not fire when exposed to a 58,600 man-equivalent-volt charge; 1 man-equivalent-volt=energy of a condenser of 0.0003 microfarad capacitance charged to a potential of 1 volt), and heat stability (fumes off when dropped onto a metal bar heated to 250° C.; decomposes in 7–10 minutes at 190–230° C. when heated in a copper block at a rate of ca. 5° C./minute).

(C) Transesterification of 2,3-bis(difluoramino)-1,4-butanediol diformate with nitric acid Five milliliters of a mixture of 50% nitric acid and 50% sulfuric acid (by weight) is added dropwise to 0.5 gram of 2,3-bis(difluoroamino)-1,4-butanediol diformate in a 25-milliliter three-necked flask fitted with an addition funnel, condenser, and thermometer, the contents of the flask being kept at 24–25° C. by means of a water bath during the addition. The mixture is stirred for two hours at 24° C., after which time it is poured over ice and extracted with three portions of methylene chloride. The methylene chloride solution is washed twice with water, once with 5% aqueous sodium bicarbonate solution, and once more with water. The methylene chloride solution then is dried over anhydrous sodium sulfate, and the methylene chloride is evaporated off. The infrared spectrum of the remaining liquid is identical to that of a pure sample of 2,3-bis(difluoramino)-1,4-butanediol dinitrate, prepared by the previously disclosed method.

EXAMPLE 2

(A) Preparation of 2-butene-1,4-diol diacetate

Acetyl chloride (470 grams) is added dropwise over a period of 2–3 hours to an agitated mixture of 265 grams of 2-butene-1,4-diol, 570 grams of pyridine, and 500 milliliters of diethyl ether, the temperature being held below 35° C. during the addition. The reaction mixture is then stirred for 2 hours at room temperature, after which time water is added to the mixture to dissolve the pyridine hydrochloride formed. The ether layer and water layer are separated; the water layer is washed twice with 200-milliliter portions of diethyl ether; ether layers are combined and the combined layers washed twice with water and twice with 4% sodium bicarbonate solution. The ether solution is dried over magnesium sulfate, the solvent stripped off, and the product vacuum distilled to give 440 grams of 2-butene-1,4-diol diacetate, boiling at 113–115° C. at 4.4 mm.

(B) Preparation of 2,3-bis(difluoramino)-1,4-butanediol diacetate

Into a solution of 84 grams of 2-butene-1,4-diol diacetate in 500 milliliters of methylene chloride is introduced tetrafluorohydrazine at a gradually increasing pressure in increments of 50 p.s.i.g. until a pressure of 300 p.s.i.g. is reached. The mixture is heated slowly and held at constant pressure for 1.5 hours. The methylene chloride is distilled off in vacuo, leaving 110 grams of 2,3-bis(difluoramino)-1,4-butanediol diacetate, identified by infrared and nuclear magnetic resonance spectroscopy.

(C) Transesterification of 2,3-bis(difluoramino)-1,4-butanediol diacetate with nitric acid A solution of 400 grams of 2,3-bis(difluoramino)-1,4-butanediol diacetate in sufficient methylene chloride to provide about an 80% concentration is added slowly to 1500 milliliters of a mixture of 50% nitric acid and 50% sulfuric acid (by weight), and the mixture is stirred for about 12 hours at room temperature, after which time it is drowned in water, and the organic layer washed with water and 4% sodium bicarbonate solution, and dried over magnesium sulfate. The methylene chloride is evaporated off, leaving 369 grams of a liquid, whose infrared spectrum is identical to that of 2,3-bis(difluoramino)-1,4-butanediol dinitrate, prepared as described in Example 1.

We claim:

1. A process for preparing 2,3-bis(difluoramino)-1,4-butanediol dinitrate which comprises transesterifying a lower aliphatic diester of 2,3 - bis(difluoramino) - 1,4-butanediol with nitric acid.

2. A process for preparing 2,3-bis(difluoramino)-1,4-butanediol dinitrate which comprises:
   (a) reacting 2-butene-1,4-diol with a lower aliphatic acylating agent,
   (b) reacting the resulting 2-butene-1,4-diol diester with tetrafluorohydrazine, and
   (c) reacting the resulting 2,3-bis(difluoramino)-1,4-butanediol diester with nitric acid.

3. A process of claim 2 wherein said lower aliphatic acylating agent is selected from the group consisting of formic acid, acetic acid, acetic anhydride, and acetyl chloride.

4. A process of claim 3 wherein said 2,3-bis(difluoramino)-1,4-butanediol diester is reacted with a nitrating acid at a temperature of about from 0 to 100° C.

5. A process of claim 4 wherein said nitrating acid is a mixture of nitric and sulfuric acids.

6. A process of claim 5 wherein said 2-butene-1,4-diol is reacted with formic acid.

7. 2,3-bis(difluoramino)-1,4-butanediol diformate.

References Cited

UNITED STATES PATENTS 2,889,359   6/1959   Guest et al. _____ 260—488

LELAND A. SEBASTIAN, Primary Examiner

U.S. Cl. X.R.

149—92, 109; 260—488 R